(12) United States Patent
Maehashi et al.

(10) Patent No.: US 7,964,066 B2
(45) Date of Patent: Jun. 21, 2011

(54) METHOD FOR CONTROLLING STRUCTURE OF NANO-SCALE SUBSTANCE, AND METHOD FOR PREPARING LOW DIMENSIONAL QUANTUM STRUCTURE HAVING NANO-SCALE USING THE METHOD FOR CONTROLLING STRUCTURE

(75) Inventors: Kenzo Maehashi, Hirakata (JP); Koichi Inoue, Kobe (JP); Kazuhiko Matsumoto, Suita (JP); Yasuhide Ohno, Mino (JP)

(73) Assignee: Japan Science and Technology Agency, Kawaguchi-shi (JP)

( * ) Notice: Subject to any disclaimer, the term of this patent is extended or adjusted under 35 U.S.C. 154(b) by 1481 days.

(21) Appl. No.: 10/569,548

(22) PCT Filed: Aug. 18, 2004

(86) PCT No.: PCT/JP2004/011838
§ 371 (c)(1),
(2), (4) Date: Feb. 27, 2006

(87) PCT Pub. No.: WO2005/021420
PCT Pub. Date: Mar. 10, 2005

(65) Prior Publication Data
US 2007/0004231 A1    Jan. 4, 2007

(30) Foreign Application Priority Data
Aug. 29, 2003  (JP) ................................ 2003-307602

(51) Int. Cl.
*C07C 1/00* (2006.01)
*C01B 31/00* (2006.01)

(52) U.S. Cl. ............... 204/157.15; 204/157.47; 977/901
(58) Field of Classification Search ............. 204/157.15, 204/157.47; 977/901
See application file for complete search history.

(56) References Cited

U.S. PATENT DOCUMENTS

| 7,396,520 B2 * | 7/2008 | Howard et al. ........... 423/445 B |
| 2006/0013758 A1 | 1/2006 | Iijima et al. ............... 423/447.3 |

FOREIGN PATENT DOCUMENTS

| CN | 1424250 | 6/2003 |
| CN | 1678522 | 10/2005 |
| EP | 1 591 417 A1 | 11/2005 |
| JP | 05-261267 A | 10/1993 |

(Continued)

OTHER PUBLICATIONS

Bokova et al., "Laser-Induced Effects in Raman Spectra of Single-Wall Carbon Nanotubes", Quantum Electronics (Jul. 31, 2003), vol. 33, No. 7, pp. 645-650.*

(Continued)

*Primary Examiner* — Edna Wong
(74) *Attorney, Agent, or Firm* — Harness, Dickey & Pierce, P.L.C.

(57) ABSTRACT

A method for controlling a structure of a nano-scale substance, which comprises irradiating a mixture of low-dimensional quantum structures having a nano-scale with an electromagnetic wave in an oxygen atmosphere, to thereby selectively oxidize a low-dimensional quantum structure having a density of states resonating with the electromagnetic wave used for the irradiation. The method allows a low-dimensional quantum structure having a specific structure to be selectively disappeared from the mixture of low-dimensional quantum structures having a nano-scale.

11 Claims, 10 Drawing Sheets

FOREIGN PATENT DOCUMENTS

| | | |
|---|---|---|
| JP | 09-083075 | 3/1997 |
| JP | 2002-37614 | 2/2002 |
| JP | 2004-210608 A | 7/2004 |
| JP | 2004-284852 A | 10/2004 |

OTHER PUBLICATIONS

Yudasaka et al., "Diameter-Selective Removal of Single-Wall Carbon Nanotubes Through Light-Assisted Oxidation", Chemical Physics Letters (Jun. 4, 2003), vol. 374, Issues 1-2, pp. 132-136.*

Yudasaka et al., "Diameter-Selective Removal of Single-Wall Carbon Nanotubes Through Light-Assisted Oxidation", Chemical Physics Letters (Jun. 4, 2003), vol. 374, Issues 1-2, pp. 132-136.*

Bokova et al., "Laser-Induced Effects in Raman Spectra of Single-Wall Carbon Nanotubes", Quantum Electronics (Jul. 31, 2003), vol. 33, No. 7, pp. 645-650.*

Irle et al., "Theoretical Study of Structure and Raman Spectra for Models of Carbon Nanotubes in Their Pristine and Oxidized Forms", J. Phys. Chem. A (no month, 2002), vol. 106, pp. 11973-11980.*

Bokova et al., "Laser-Induced Effects in Raman Spectra of Single-Wall Carbon Nanotubes", Quantum Electronics (Jul. 31, 2003), vol. 33, No. 7, pp. 645-650.*

Irle et al., "Theoretical Study of Structure and Raman Spectra for Models of Carbon Nanotubes in Their Pristine and Oxidized Forms", J. Phys. Chem. A (no month, 2002), vol. 106, pp. 11973-11980.*

Osadchy et al., "Modeling of Electron Density of States for Single-Wall Carbon and Boron Nitride Nanotubes", JETP Letters (Apr. 2003), vol. 77, No. 8, pp. 405-410.*

M. Yudasaka et al., "Diameter-selective removal of single-wall carbon nanotubes through light-assisted oxidation", Chemical Physics Letters, Jun. 4, 2003, vol. 374, Nos. 1,2, pp. 132 to 136.

Chinese Office Action, dated Jul. 3, 2009, issued in corresponding Chinese Application No. 2004800242359 and English translation thereof.

Japanese Office Action, dated Jul. 21, 2009, issued in corresponding Japanese Application No. 2003-307602 and English translation thereof.

* cited by examiner

METHOD FOR CONTROLLING STRUCTURE OF NANO-SCALE SUBSTANCE, AND METHOD FOR PREPARING LOW DIMENSIONAL QUANTUM STRUCTURE HAVING NANO-SCALE USING THE METHOD FOR CONTROLLING STRUCTURE

TECHNICAL FIELD

The present invention relates to a method for controlling a structure of a nano-scale substance whereby a nano-scale substance such as a low-dimensional quantum structure, which may be a one-dimensional structure such as a carbon nanotube, or a zero-dimensional structure such as a nanoparticle is selectively controlled. The invention also relates to a method for producing a nano-scale low-dimensional quantum structure using such a structure control method.

BACKGROUND ART

The development of high-tech materials and new materials has a significant importance as it forms the basis of industry and science and technology in a wide variety of fields such as electronics, environment energy, and biotechnology. In recent years, the development of nano-scale substances has drawn many interests since they possess totally novel properties and functions not found in bulk substances.

Carbon nanotubes are an example of such a nano-scale substance. Carbon nanotubes have a tube-like structure made out of a graphite sheet. There are two types of carbon nanotubes: single-walled nanotubes and multi-walled nanotubes, depending on whether the tube is single-walled or multi-walled. The electrical properties of the carbon nanotube are unique in the sense that the nanotube can be a metal or a semiconductor depending on its chirality.

Figure 2:
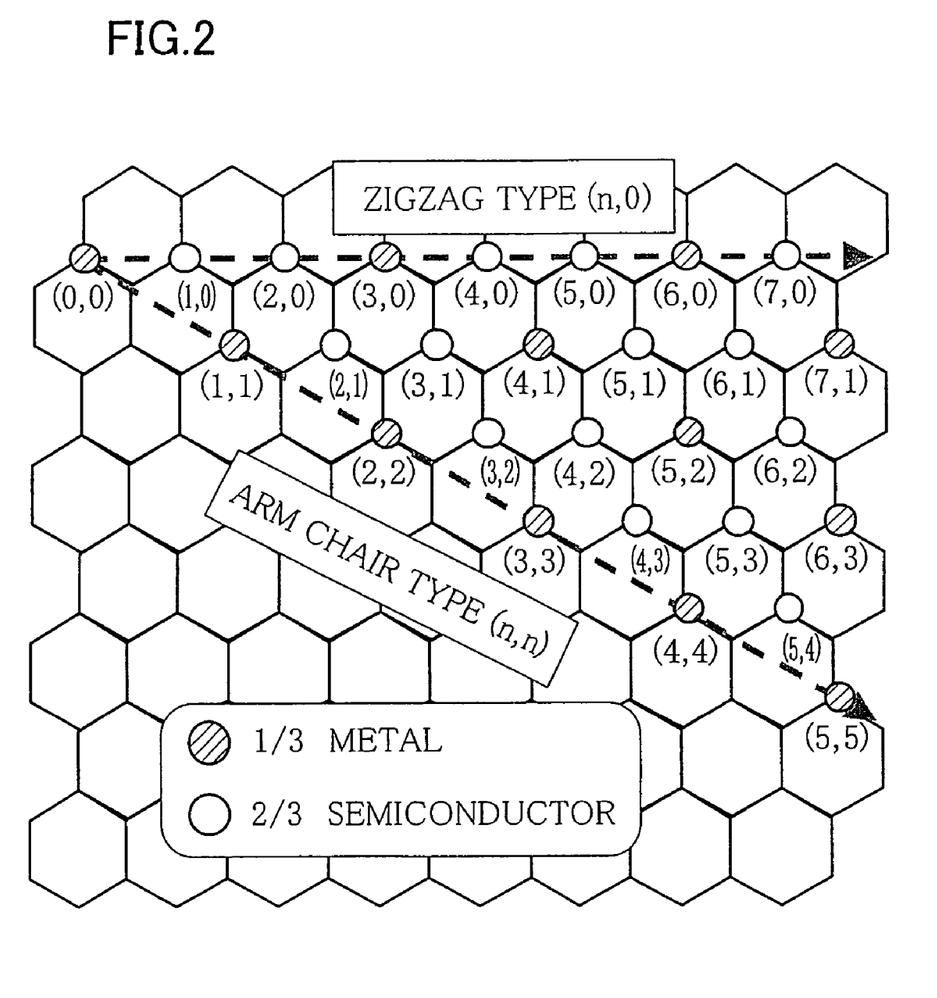
FIG. 2 schematizes a graphite sheet, representing differing chiralities of carbon nanotubes.

Referring to FIG. 2, the following describes chirality of the carbon nanotube. As illustrated in FIG. 2, carbon nanotubes have different chiralities depending on the way the graphite sheets are wound. Carbon nanotubes of differing chirality have different densities of states (electronic states).

As described above, the chirality of carbon nanotubes varies, and as such a synthesis of carbon nanotubes produces structures of differing chiralities and differing electronic states.

Thus, if the carbon nanotubes were to be used for industrial, manufacturing, and academic purposes, a carbon nanotube of a specific structure would be needed depending on use. Accordingly, there is a demand for a method of selectively obtaining carbon nanotubes of the same structure from different structures of carbon nanotubes.

However, to this date, there has been no method that selectively obtains or removes carbon nanotubes of a specific structure from carbon nanotubes having different electronic states.

The present invention was made in view of the foregoing problem, and an object of the present invention is to provide a method for controlling a nano-scale low-dimensional quantum structure, whereby a low-dimensional quantum structure of a specific density of state is selectively oxidized from a mixture of low-dimensional quantum structures. The invention also provides a method for producing a nano-scale low-dimensional quantum structure using such a structure control method.

DISCLOSURE OF INVENTION

In order to achieve the foregoing objects, the inventors of the present invention measured Raman spectra of sample single-walled carbon nanotubes at different wavelengths. It was found as a result that the spectra had peaks at different positions depending on the excited wavelengths. Based on the assumption that single-walled carbon nanotubes with different densities of states and therefore different electronic states would resonate with electromagnetic waves of different wavelengths, the inventors accomplished the invention by finding that structures of the nanotubes can be controlled according to the resonance of the nanotubes.

In order to achieve the foregoing objects, a structure control method according to the present invention includes irradiating a mixture of nano-scale low-dimensional quantum structures of differing densities of states with an electromagnetic wave in an oxygen atmosphere, so as to selectively oxidize a low-dimensional quantum structure of a density of states resonating with the electromagnetic wave.

The structure control method according to the present invention may be adapted so that the mixture is irradiated with the electromagnetic wave so as to remove from the mixture the low-dimensional quantum structure of a density of states resonating with the electromagnetic wave.

With the foregoing structure control method, low-dimensional quantum structures resonating with the irradiating electromagnetic wave absorb more electromagnetic wave, and increasing the intensity of the electromagnetic wave oxidizes the low-dimensional quantum structures resonating with the electromagnetic wave. Thus, a low-dimensional quantum structure with a specific electronic state can be selectively oxidized from a mixture of low-dimensional quantum structures of differing densities of states. Further, by being oxidized, a low-dimensional quantum structure with a specific density of states can be selectively removed. Further, a low-dimensional quantum structure with a desired density of states can be selectively retained in the mixture. That is, low-dimensional quantum structures with the same electronic state can be selectively obtained from low-dimensional quantum structures of differing electronic states.

In order to achieve the foregoing objects, a producing method of a nano-scale low-dimensional quantum structure according to the present invention includes the step of irradiating a mixture of nano-scale low-dimensional quantum structures of differing densities of states with an electromagnetic wave in an oxygen atmosphere, so as to selectively oxidize a low-dimensional quantum structure of a density of states resonating with the electromagnetic wave and thereby remove a structure with the density of states resonating with the electromagnetic wave.

With the producing method of a nano-scale low-dimensional quantum structure, a nano-scale low-dimensional quantum structure can be produced from a mixture of low-dimensional quantum structures, by removing a low-dimensional quantum structure with a specific density of states.

Further, in order to achieve the foregoing objects, a producing method of a nano-scale low-dimensional quantum structure according to the present invention includes the step of irradiating a mixture of nano-scale low-dimensional quantum structures of differing densities of states with an electromagnetic wave in an oxygen atmosphere, so as to selectively oxidize a low-dimensional quantum structure of a density of states resonating with the electromagnetic wave and thereby retain a structure with a density of states not resonating with the electromagnetic wave.

With the producing method of a nano-scale low-dimensional quantum structure, a nano-scale low-dimensional quantum structure can be produced from a mixture of low-dimensional quantum structures, by selectively retaining a low-dimensional quantum structure with a desired density of states.

Additional objects, features, and strengths of the present invention will be made clear by the description below. Further, the advantages of the present invention will be evident from the following explanation in reference to the drawings.

BEST MODE FOR CARRYING OUT THE INVENTION

Referring to the attached drawings, the following will describe one embodiment of the present invention. It should be noted that the invention is not limited by the following description.

Preferably, a nano-scale structure subjected to a structure control method of the present invention is a low-dimensional quantum structure. As used herein, the "low-dimensional quantum structure" refers to a zero-dimensional structure (sphere) such as nanoparticles or other ultra fine particles, and a one-dimensional structure (stylus) such as nanotubes and nanowires. Further, as used herein, the term "nano-scale" refers to structures with a particle size or outer diameter of not more than 100 nm. However, a structure control method of the present invention can suitably be used for those with a particle size or outer diameter of not more than 10 nm, and more suitably for those with a particle size or outer diameter of not more than 3 nm.

It is preferable that the low-density quantum structure have a spiked density of states. An example of such a structure is a nanotube. The nanotube may be single-walled or multi-walled, but a single-walled structure is more preferable. The nanotube has an outer diameter of preferably not more than 10 nm, or more preferably not more than 3 nm. As used herein, "spiked" means that the peak of the density of states has a sharp end, instead of a step-like end or a radiating end.

In the case where a single-walled carbon nanotube is used by a structure control method of the present invention, the single-walled carbon nanotube can be formed by ordinary methods. For example, an ark discharge method, a laser evaporation method, or a chemical vapor deposition method (CVD) may be used with a catalyst metal, which may be, for example, iron, nickel, cobalt, platinum, palladium, rhodium, lanthanum, or yttrium. In the case where the CVD method is used, carbon nanotubes can be formed on a substrate by the high-temperature reaction of acetylene, benzene, ethane, ethylene, ethanol, or the like with a catalyst metal. The material of the substrate is not particularly limited as long as it can withstand high temperature. For example, silicon, zeolite, quarts, and sapphire can be used.

In a structure control method of the present invention, the electromagnetic wave used to irradiate the low-dimensional quantum structure is not particularly limited as long as it can resonate the low-dimensional quantum structure to be oxidized and is strong enough to oxidize the low-dimensional quantum structure. A non-limiting example is a laser beam. Further, with use of an electromagnetic wave of a wide wavelength range for example, low-dimensional quantum structures with different electronic states can be oxidized at once. Note that, the intensity of the electromagnetic wave may be measured by measuring energy density for example.

Further, in a structure control method of the present invention, the electromagnetic wave used to irradiate the low-dimensional quantum structure may be converged. Converging the electromagnetic wave allows for localized irradiation of a mixture of low-dimensional quantum structures. More specifically, low-dimensional quantum structures to be used for different purposes can be selectively oxidized and removed at different locations. The electromagnetic wave can be converged by an ordinary method, using a lens for example.

Figure 1:
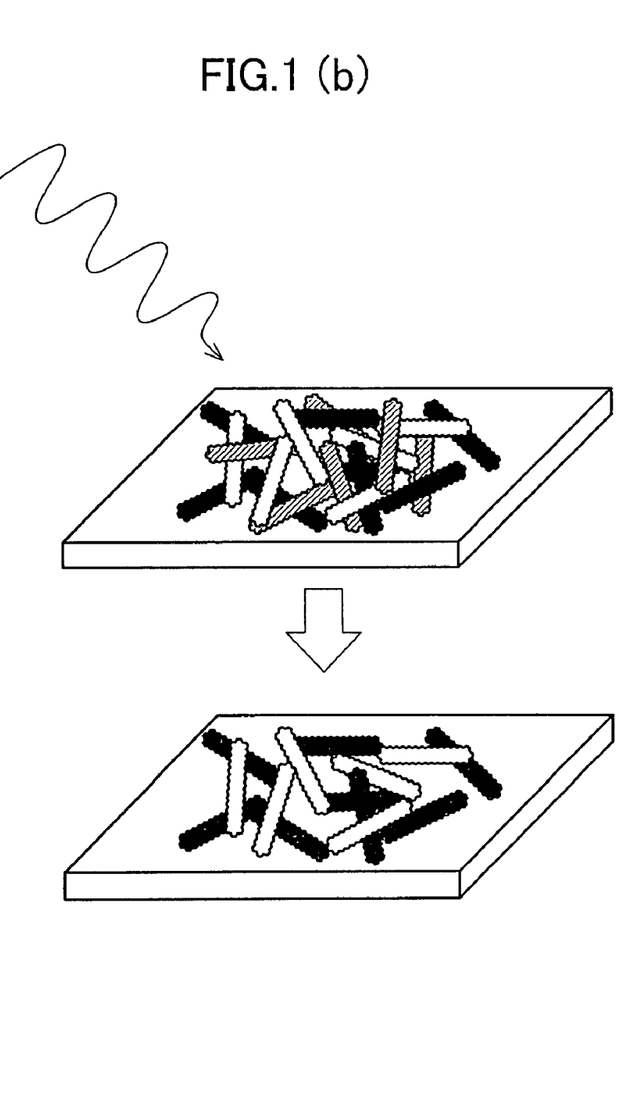
FIGS. 1(a) and 1(b) schematize carbon nanotubes irradiated with electromagnetic waves of different wavelengths according to one embodiment of the present invention.

Referring to FIGS. 1(a) and 1(b), the following will describe a structure control method according to the present invention. A structure control method of the present invention is performed in an atmosphere of oxygen, in order to oxidize a low-dimensional quantum structure of a specific structure. For example, the method can be performed in an atmosphere. As shown in FIGS. 1(a) and 1(b), with the irradiation of electromagnetic waves of different wavelengths in an atmosphere, the low-dimensional quantum structures resonating with the electromagnetic waves in the mixture (blanked in FIG. 1(a), hatched in FIG. 1(b)) absorb more electromagnetic wave. Here, if intensity of the electromagnetic waves is increased, only the resonating low-dimensional quantum structures are oxidized and these low-dimensional quantum structures cannot retain their original structures. In the case where the low-dimensional quantum structures are carbon for example, the low-dimensional quantum structures resonating with the irradiating electromagnetic waves are converted into COx by being oxidized and therefore can be removed. Note that, low-dimensional quantum structures not resonating with the electromagnetic waves are not oxidized and remain.

Figure 3:
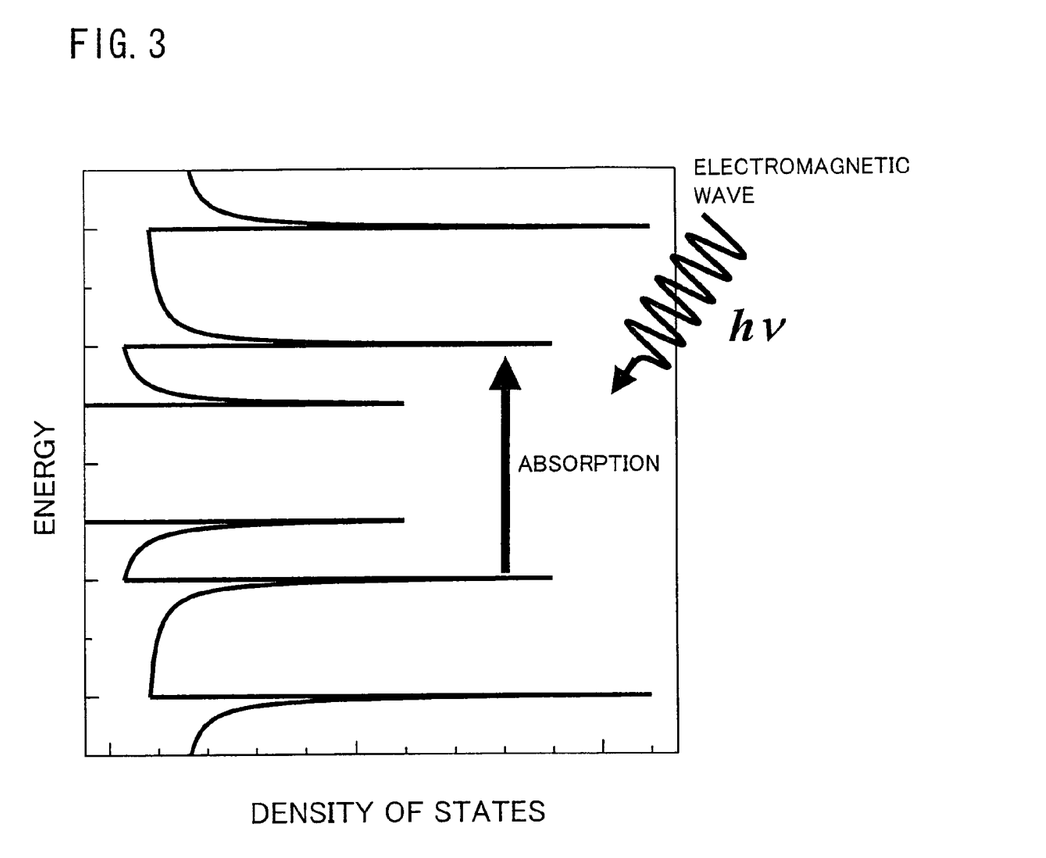
FIG. 3 represents a relationship between energy and a density of states of carbon nanotubes.

In the following, description is made as to how resonance occurs. Carbon nanotubes of differing chirality have different densities of states. As shown in FIG. 3, when a single-walled carbon nanotube with certain chirality (as represented by the density of states in FIG. 3) is irradiated with an electromagnetic wave of a certain wavelength, the low-density quantum structure resonates and absorbs more electromagnetic wave when the energy difference between spikes is close to the energy of the electromagnetic wave. Note that, the energy difference between spikes in the density of states is different when the chirality is different.

As described above, with a structure control method according to the present invention, a low-dimensional quantum structure with a specific density of states can be selectively oxidized and eliminated from a mixture of low-dimensional quantum structures having different densities of states. Further, by oxidizing different kinds of low-dimensional quantum structures, a low-dimensional quantum structure with a desired density of states can be selectively retained in the mixture. That is, low-dimensional quantum structures of the same density of states can be selectively obtained from low-dimensional quantum structures having different densities of states.

Whether the low-dimensional quantum structures resonating with the irradiating electromagnetic waves have been oxidized, or whether non-resonating low-dimensional quantum structures were not oxidized can be found by measuring the spectrum of the low-dimensional quantum structures before and after the irradiation of the electromagnetic waves, using Raman spectrometry for example. More specifically, whether or not low-dimension quantum structures have been oxidized can be confirmed by measuring the Raman spectrum before and after the irradiation of electromagnetic waves of different wavelengths, and then measuring a reduction in the peak intensity of the spectrum. Here, in order to prevent non-target low-dimensional quantum structures from being oxidized, the spectrum needs to be measured with electromagnetic waves of low energy density. The method of confirming oxidation is not just limited to the foregoing method.

EXAMPLES

The following will describe Examples of the present invention in detail based on Experiment 1 through Experiment 3. It should be noted here that the invention is not limited by the following description.

Experiment 1

Single-Walled Carbon Nanotube

A sample single-walled carbon nanotube was synthesized with ethanol that has been applied on a silicon (Si) substrate coated with an iron-containing catalyst. The reaction was performed at 900° C. using a thermal CVD method.

Figure 4:
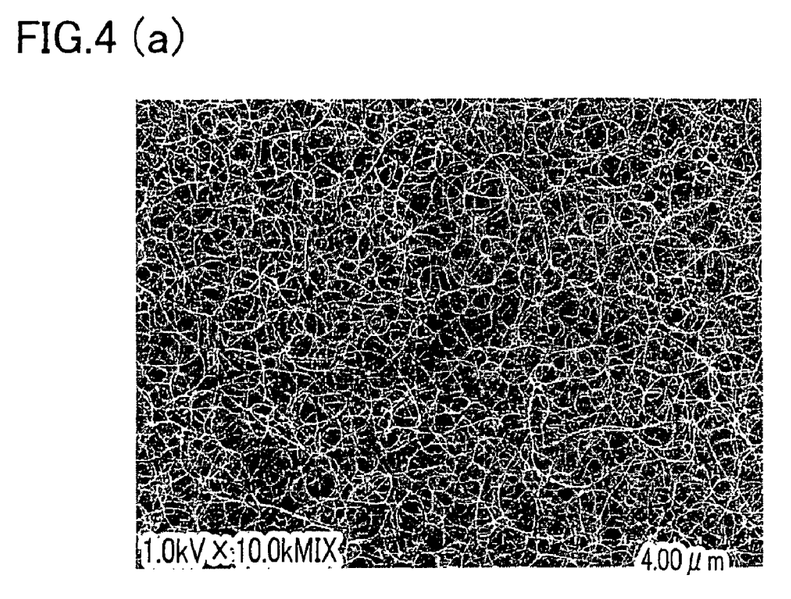
FIG. 4(a) is a view showing an SEM image of sample single-walled carbon nanotubes.
FIG. 4(b) is a magnified view of FIG. 4(a).

The sample single-walled carbon nanotube prepared in the experiment was observed under SEM. FIGS. 4(a) and 4(b) are resulting SEM images. As shown in FIG. 4(a), a growth of SWNT was confirmed on the substrate. FIG. 4(b) is a magnified view of FIG. 4(a).

Figure 5:
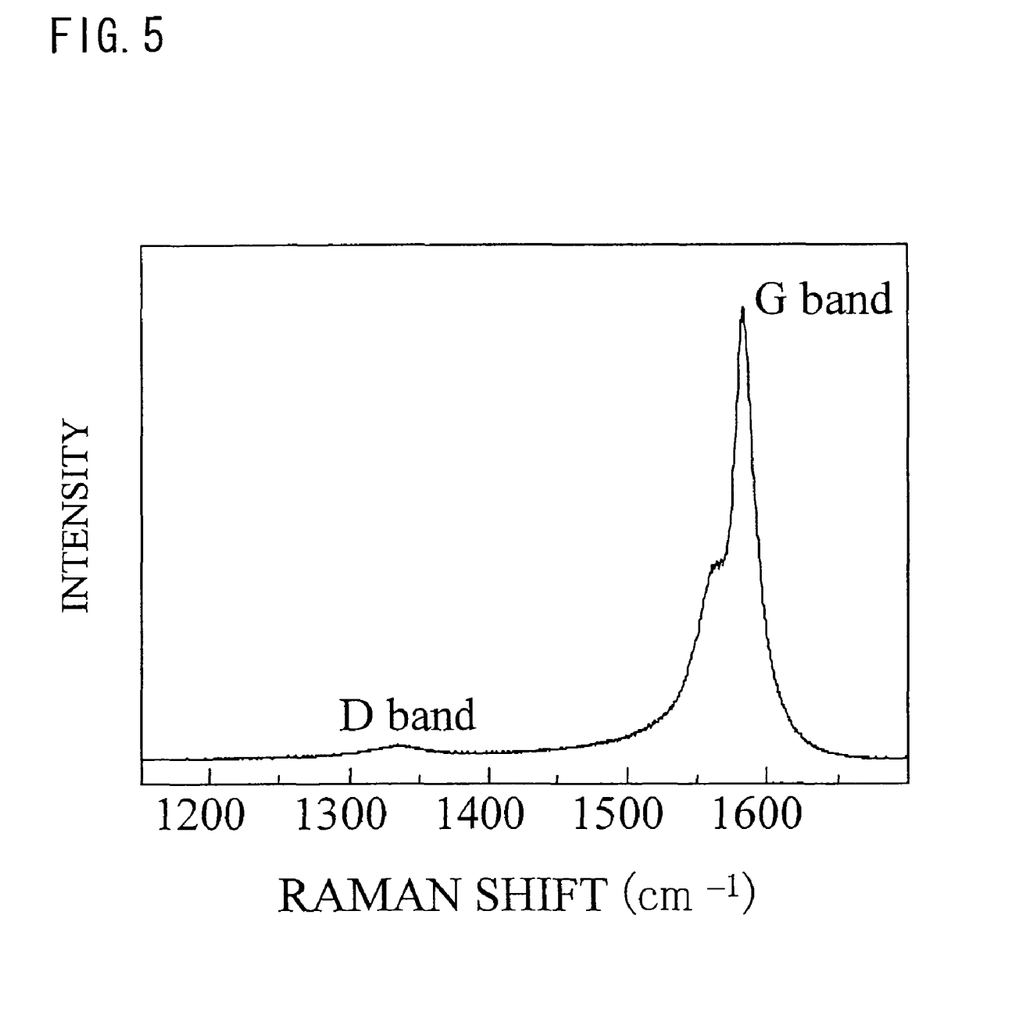
FIG. 5 represents a Raman spectrum of sample single-walled carbon nanotubes in the high frequency range.

A Raman spectrum of the sample was also measured. FIG. 5 represents the result. As the excited light source, an Ar ion laser ($\lambda$=514.5 nm) was used.

As shown in FIG. 5, the spectrum in the high frequency range had two large peaks, called G band and D band. The G band in the vicinity of 1590 $cm^{-1}$ originates from graphite (or more accurately, oscillation in the hexagonal lattice of the carbon atoms). The D band in the vicinity of 1350 $cm^{-1}$ originates from defects in the single-walled carbon nanotube, or carbon atoms with dangling bonds, such as amorphous carbon. As such, larger values of G/D (G band/D band) intensity ratio provide SWNT of better crystallinity. The sample prepared in this experiment had a G/D ratio of about 50, providing high-quality SWNT.

Experiment 2

Excited Wavelength Dependency of Raman Spectra

Figure 6:
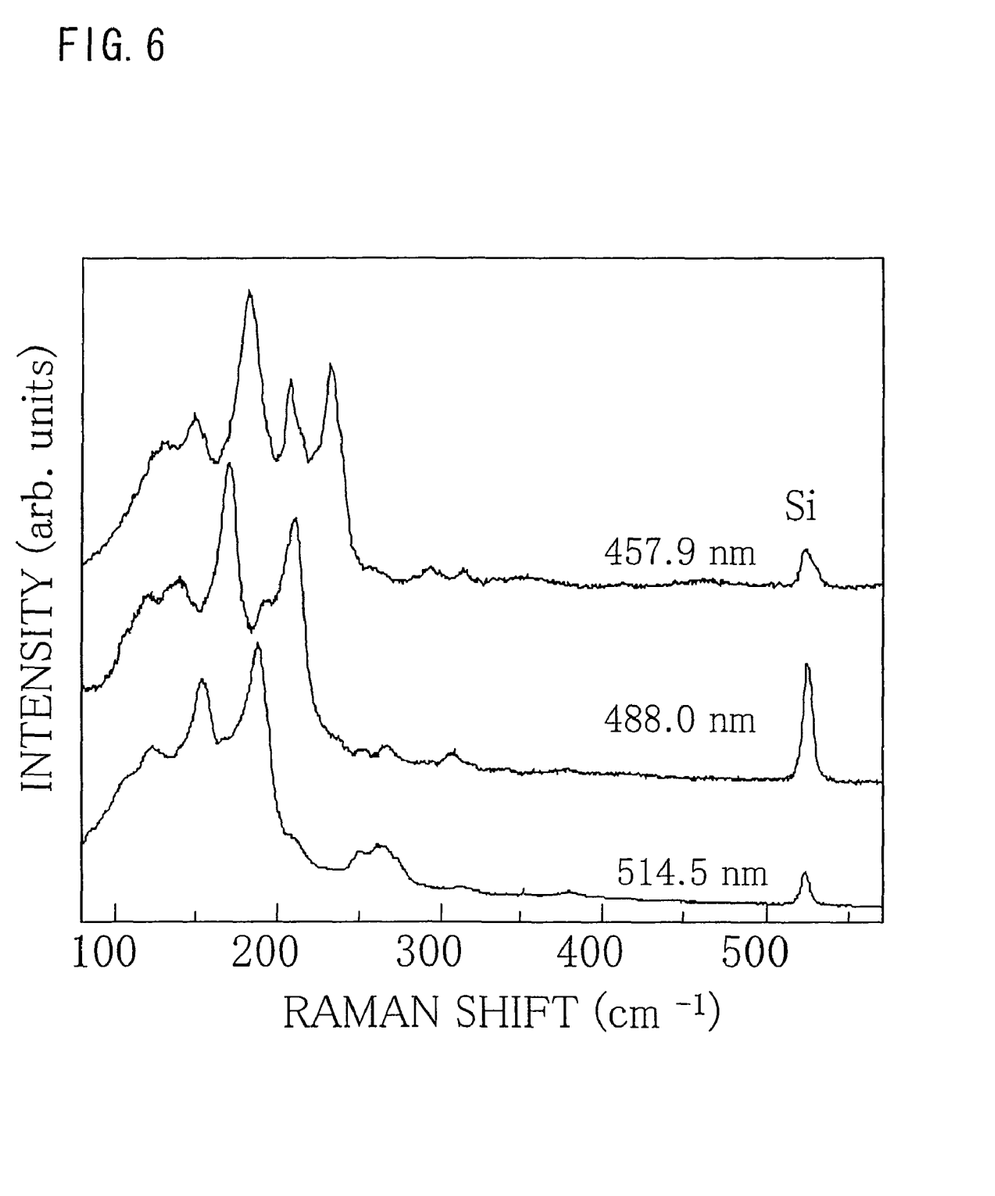
FIG. 6 represents Raman spectra of sample single-walled carbon nanotubes irradiated with laser beams of different wavelengths.

The sample single-walled carbon nanotube obtained in Experiment 1 was irradiated with laser beams (energy density of 1 $kW/cm^2$, wavelengths of 514.5 nm, 488.0 nm, and 457.9 nm) in an atmosphere, and Raman spectra were measured. As the light source, an Ar laser was used. FIG. 6 shows the results. The Raman spectra shown in FIG. 6 respectively corresponds to, from the top, the wavelengths of 457.9 nm, 488.0 nm, and 514.5 nm of the irradiating laser beams. As can be seen from FIG. 6, the Raman spectra of different wavelengths had peaks at different positions. This indicates that single-walled carbon nanotubes with different densities of states are resonating with the different wavelengths of the irradiating laser beams.

Experiment 3

Raman Spectra after Irradiation of High Energy Density Laser Beam

Figure 7A:
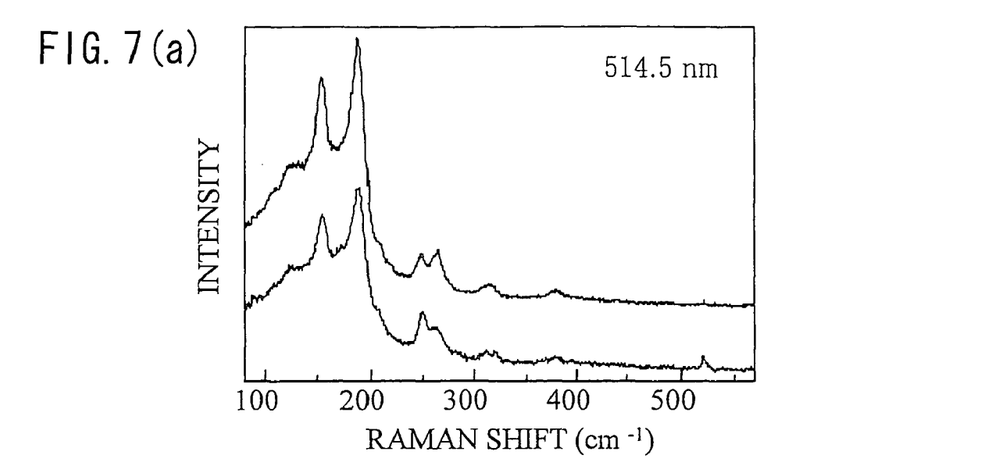
FIGS. 7(a) through 7(c) represent Raman spectra of sample single-walled carbon nanotubes before and after 30 minute irradiation of a laser beam at 20 kW/cm$^2$.
Figure 7B:
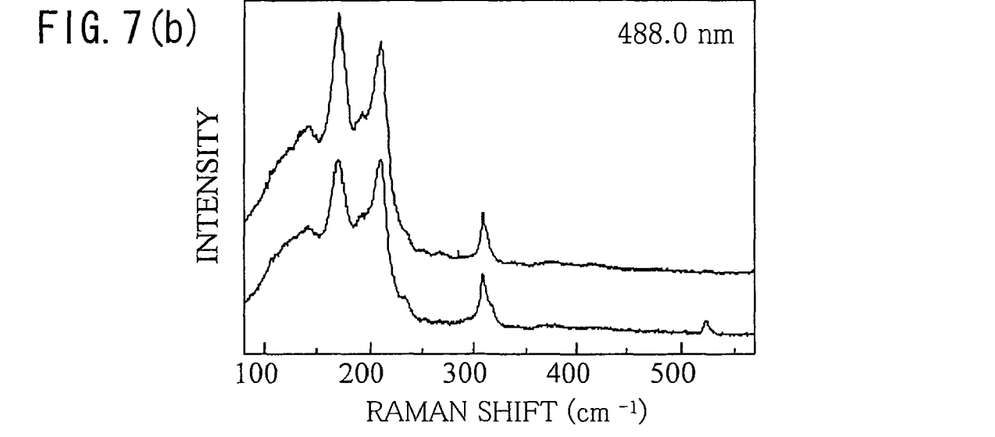
Figure 7C:
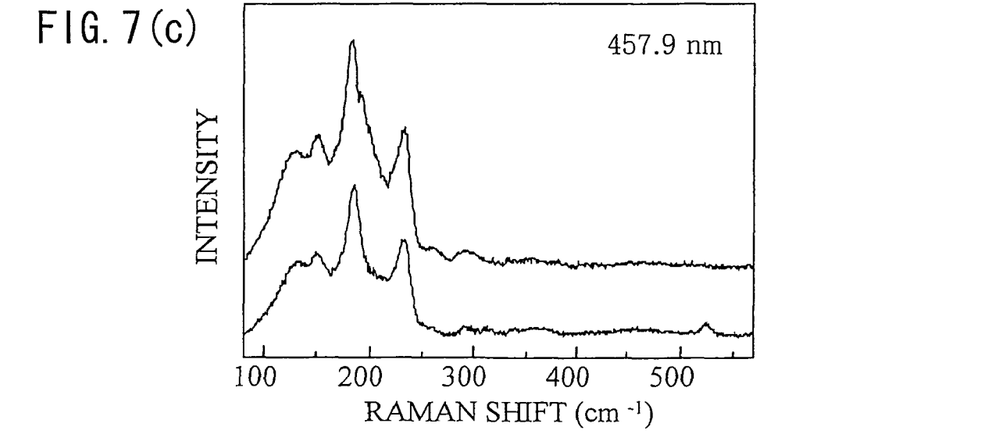

The sample carbon nanotube obtained in Experiment 1 was irradiated with an Ar laser (energy density of 20 $kW/cm^2$, wavelength of 514.5 nm) for 30 minutes in an atmosphere, and Raman spectra were measured. The measurement of Raman spectra was performed according to the procedure of Experiment 2. FIGS. 7(a) through 7(c) show the results. Note that, in each of FIGS. 7(a) through 7(c), the upper spectrum is before irradiation of the laser beam, and the lower spectrum is after irradiation of the laser beam. The same also applies to FIGS. 8(a) through 8(c), and FIG. 10. As can be seen from FIGS. 7(a) through 7(c), after irradiation of the laser beam with the energy density of 20 $kW/cm^2$, there was a slight decrease in the peak intensity of the single-walled carbon nanotube of a density of state resonating with the laser beam of each different wavelength.

Figure 8A:
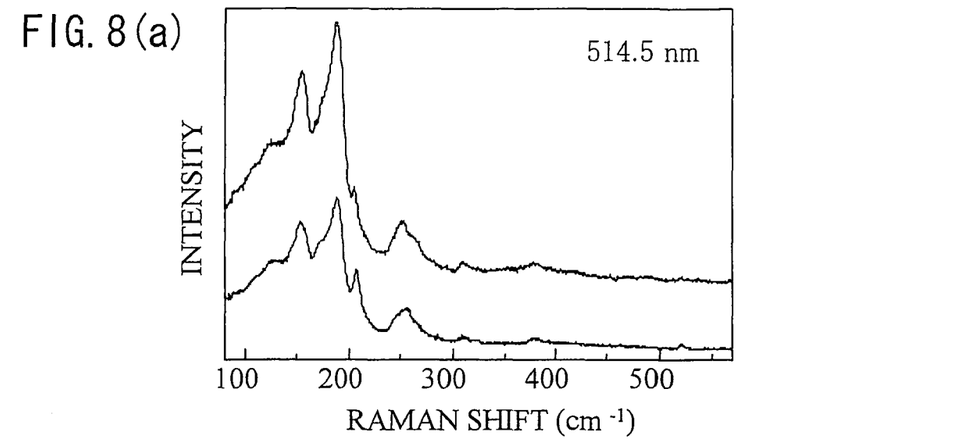
FIGS. 8(a) through 8(c) represent Raman spectra of sample single-walled carbon nanotubes before and after 2 hour irradiation of a laser beam at 10 kW/cm$^2$.
Figure 8B:
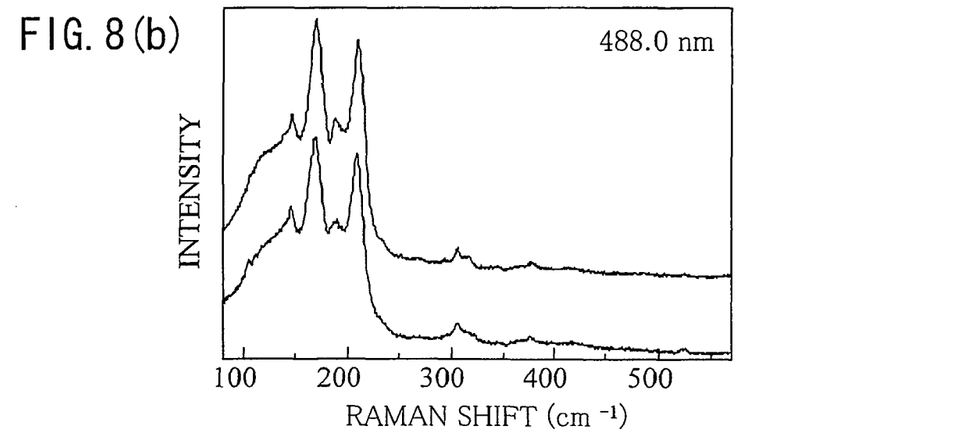
Figure 8C:
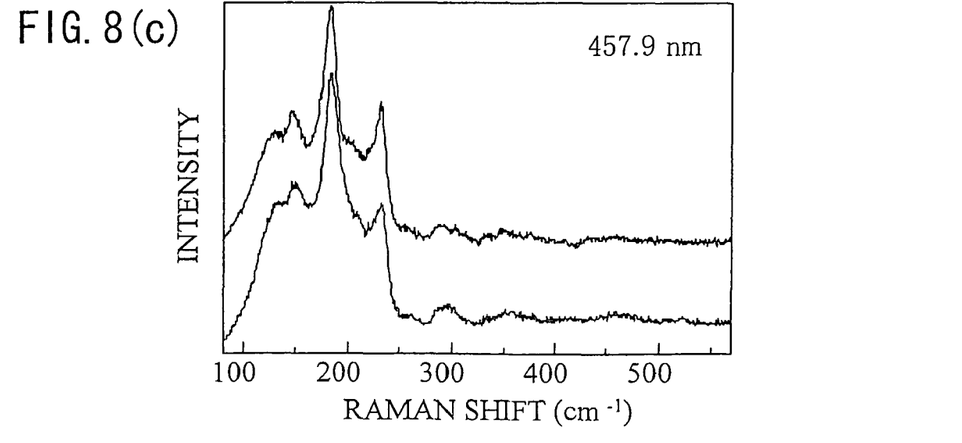

In the same manner, the sample carbon nanotube was irradiated with an Ar laser for 2 hours at the energy density of 10 $kW/cm^2$, and Raman spectra were measured. The results are shown in FIGS. 8(a) through 8(c). As can be seen from FIGS. 8(a) through 8(c), after irradiation of the laser beam with the energy density of 10 $kW/cm^2$, there was a significant decrease in the peak intensity of the single-walled carbon nanotube of a density of state resonating with the laser beam of a 514.5 nm wavelength. As for the carbon nanotubes of densities of states resonating with the laser beams of 488.0 nm and 457.9 nm wavelengths, there was no large decrease in the peak intensity even after the irradiation of the laser beams, as shown in FIGS. 8(b) and 8(c).

Figure 9:
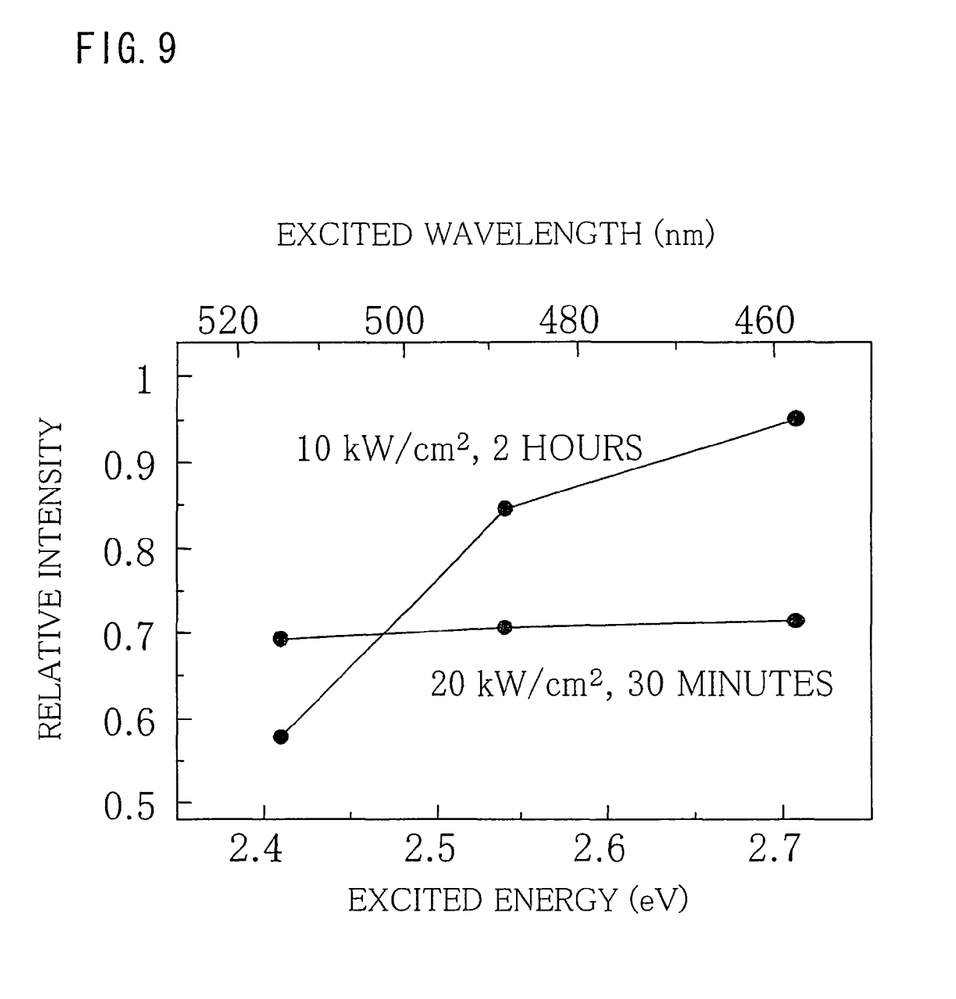
FIG. 9 is a graph representing changes in relative intensity of peaks in the Raman spectra shown in FIGS. 7(a) through 7(c) and FIGS. 8(a) through 8(c).

FIG. 9 is a graph representing the average intensity ratio of the peaks measured before and after irradiation of the laser beams. As can be seen from FIG. 9, irradiation of the laser beam of a 514.5 nm wavelength at the energy density of 10 $kW/cm^2$ selectively oxidized single-walled carbon nanotubes resonating with the 514.5 nm wavelength. That is, by adjusting the wavelength and energy density of irradiating light, single-walled carbon nanotubes of a density of states resonating with the wavelength of the irradiating light were selectively oxidized and therefore selectively removed. Carbon nanotubes of a density of states not resonating with the wavelength of irradiating light were not oxidized and remained. By being oxidized, the carbon nanotube was lost in the form of COx.

Figure 10:
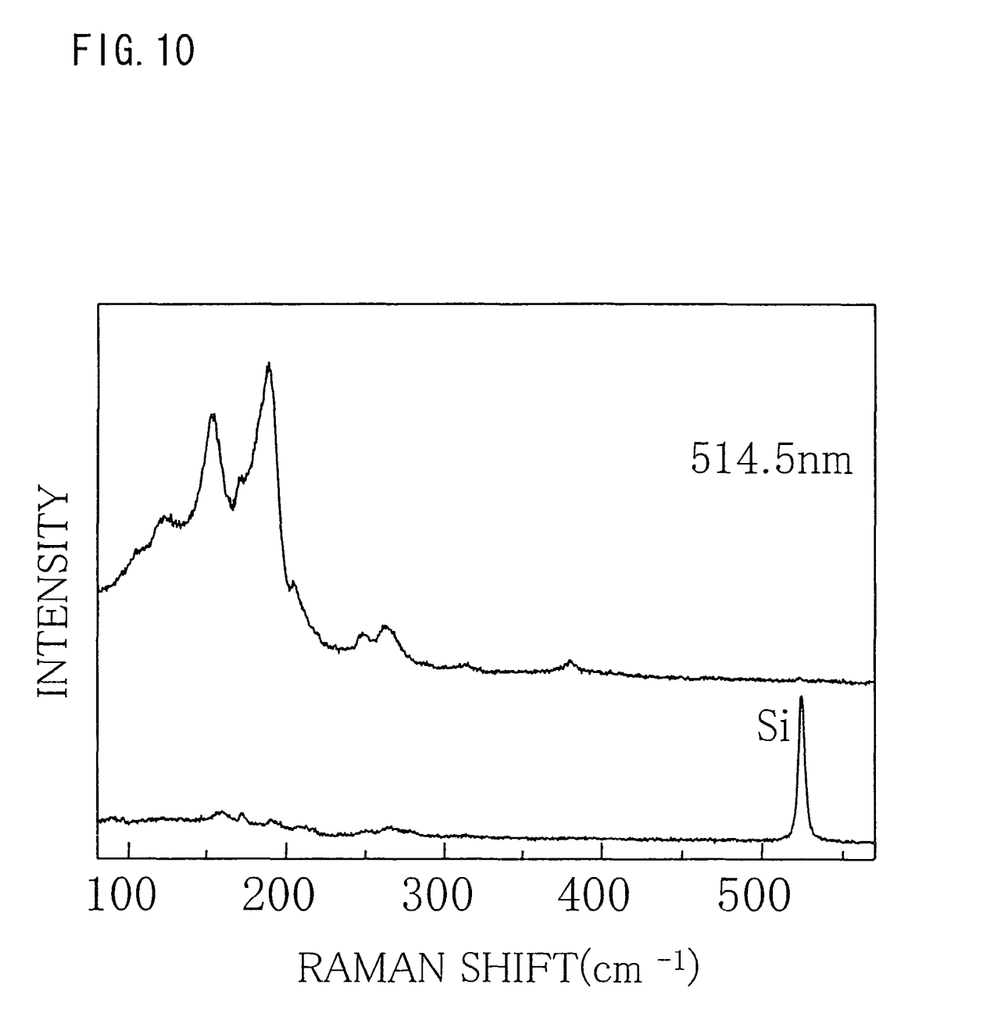
FIG. 10 represents Raman spectra of sample single-walled carbon nanotubes before and after 70 minute irradiation of a laser beam at 50 kW/cm$^2$.

In the same manner, the sample carbon nanotube was irradiated with an Ar laser for 70 minutes at the energy density of 50 $kW/cm^2$, and a Raman spectrum was measured. FIG. 10 shows the results. As shown in FIG. 10, the Raman spectrum from the Si substrate only had a peak after irradiation of an Ar laser at the energy density of 50 $kW/cm^2$. The measurement therefore showed that irradiation of an Ar laser for 70 minutes at the energy density of 50 kW/cm$^2$ oxidized and eliminated most of the single-walled carbon nanotubes.

As described above, a structure control method according to the present invention includes irradiating a mixture of nano-scale low-dimensional quantum structures of differing densities of states with an electromagnetic wave in an oxygen atmosphere, so as to selectively oxidize a low-dimensional quantum structure of a density of states resonating with the electromagnetic wave.

The mixture may be irradiated with the electromagnetic wave so as to remove therefrom a low-dimensional quantum structure of a density of states resonating with the electromagnetic wave.

Further, a producing method of a nano-scale low-dimensional quantum structure according to the present invention includes the step of irradiating a mixture of nano-scale low-dimensional quantum structures of differing densities of states with an electromagnetic wave in an oxygen atmosphere, so as to selectively oxidize a low-dimensional quantum structure of a density of states resonating with the electromagnetic wave and thereby remove a structure with the density of states resonating with the electromagnetic wave.

Further, a producing method of a nano-scale low-dimensional quantum structure according to the present invention includes the step of irradiating a mixture of nano-scale low-dimensional quantum structures of differing densities of states with an electromagnetic wave in an oxygen atmosphere, so as to selectively oxidize a low-dimensional quantum structure of a density of states resonating with the electromagnetic wave and thereby retain a structure with a density of states not resonating with the electromagnetic wave.

The low-dimensional quantum structures may be nanotubes or nanoparticles.

When the low-dimensional quantum structures are nanotubes or nanoparticles, the density of states has a spiked structure. Thus, with the foregoing structure control method, the low-dimensional quantum structures can desirably resonate with an electromagnetic wave of a specific wavelength.

The low-dimensional quantum structures may be carbon or boron nitride.

Some types of carbon or boron nitride have well defined nano-scale structures. Thus, a structure control method according to the present invention can directly be used for industrial, manufacturing, and academic purposes.

Further, the low-dimensional quantum structures may have a single-walled structure.

Single-walled low-dimensional quantum structures have a specific density of states. Thus, in using the structure control method, a wavelength of the electromagnetic wave used to resonate a specific low-dimensional quantum structure can be selected more easily.

Further, the electromagnetic wave may be a laser beam.

With the use of a laser beam as the electromagnetic wave, the wavelength or intensity of the electromagnetic wave used for irradiation can be adjusted more easily. Thus, in using the structure control method, a mixture of low-dimensional quantum structures can be efficiently irradiated with a high-energy electromagnetic wave, enabling a low-dimensional quantum structure of a specific density of states to be oxidized and removed. Since the laser beam is a highly linear beam of light and does not spread easily, it can be converged easily. The electromagnetic wave is converged for the following reason. Converging the electromagnetic wave allows for localized irradiation of a mixture of low-dimensional quantum structures. More specifically, low-dimensional quantum structures used for different purposes can be selectively oxidized and removed at different locations.

The embodiments and concrete examples of implementation discussed in the foregoing detailed explanation serve solely to illustrate the technical details of the present invention, which should not be narrowly interpreted within the limits of such embodiments and concrete examples, but rather may be applied in many variations within the spirit of the present invention, provided such variations do not exceed the scope of the patent claims set forth below.

INDUSTRIAL APPLICABILITY

According to the present invention, there are provided a structure control method, and a method for producing a nano-scale low-dimensional quantum structure using the structure control method. With the methods of the present invention, a low-dimensional quantum structure of a specific density of states resonating with the wavelength of the electromagnetic wave used for irradiation can be selectively oxidized in a mixture of low-dimensional quantum structures. By being oxidized, the low-dimensional quantum structure with a specific density of states can be selectively removed from the mixture. Further, a low-dimensional quantum structure with a desired density of states can be selectively retained in the mixture.

The present invention is therefore applicable to a wide variety of fields using nano-technology, including, for example, electronics, information communications, chemistry, materials, environment, energy, and many areas of life science, such as biotechnology, medicine, and pharmaceuticals. For example, the invention has many uses in the structure control of functional and structural materials used for optical devices, electronic devices, and micro devices. The invention is particularly effective in the structure control of functional materials used for electron-emissive materials, probes such as STM, thin lines for micro machines, thin lines for quantum effect elements, field effect transistors, single-electron transistors, hydrogen absorbing materials, and biodevices.

The invention claimed is:

1. A structure control method comprising:
   measuring a first Raman spectrum of a mixture of nano-scale low-dimensional quantum structures of differing densities of states at a wavelength of an electromagnetic wave with which the mixture of nano-scale low-dimensional quantum structures of differing densities of states is irradiated;
   irradiating the mixture of nano-scale low-dimensional quantum structures of differing densities of states with the electromagnetic wave in air for two hours after measuring the first Raman spectrum, the electromagnetic wave having an energy density of 10 kW/cm$^2$ so as to selectively oxidize and remove a low-dimensional quantum structure of a density of states resonating with the wavelength of the electromagnetic wave;
   measuring a second Raman spectrum of the irradiated mixture of nano-scale low-dimensional quantum structures at the wavelength of the electromagnetic wave; and
   measuring a reduction in peak intensity of the second Raman spectrum to confirm the selective oxidation and removal from the mixture of the low-dimensional quantum structure.

2. The structure control method as set forth in claim 1, wherein the low-dimensional quantum structures comprise nanotubes or nanoparticles.

3. The structure control method as set forth in claim 2, wherein the nanotubes or nanoparticles comprise carbon or boron nitride.

4. The structure control method as set forth in claim 2, wherein the nanotubes or nanoparticles have a single-walled structure.

5. The structure control method as set forth in claim 2, wherein the electromagnetic wave is a laser beam.

6. The structure control method as set forth in claim 1, wherein the low-dimensional quantum structures comprise carbon or boron nitride.

7. The structure control method as set forth in claim 6, wherein the low-dimensional quantum structures have a single-walled structure.

8. The structure control method as set forth in claim 6, wherein the electromagnetic wave is a laser beam.

9. The structure control method as set forth in claim 1, wherein the low-dimensional quantum structures have a single-walled structure.

10. The structure control method as set forth in claim 9, wherein the electromagnetic wave is a laser beam.

11. The structure control method as set forth in claim 1, wherein the electromagnetic wave is a laser beam.

* * * * *